United States Patent [19]
Miyazaki

[11] Patent Number: 4,797,743
[45] Date of Patent: Jan. 10, 1989

[54] VIDEO MEMORY CONTROL DEVICE
[75] Inventor: Haruhito Miyazaki, Saitama, Japan
[73] Assignee: Pioneer Electronic Corporation, Tokyo, Japan
[21] Appl. No.: 22,899
[22] Filed: Mar. 6, 1987
[30] Foreign Application Priority Data
  Mar. 6, 1986 [JP] Japan .................................. 61-49253
[51] Int. Cl.$^4$ .............................................. H04N 5/04
[52] U.S. Cl. .................................... 358/149; 358/148; 358/160
[58] Field of Search .................... 358/13, 148, 149, 19, 358/160, 337, 339

[56] References Cited
U.S. PATENT DOCUMENTS
4,249,198  2/1981  Ito et al. ................................. 358/13
4,689,676  8/1987  Nakajima et al. .................... 358/148

Primary Examiner—James J. Groody
Assistant Examiner—David E. Harvey
Attorney, Agent, or Firm—Sughrue, Mion, Zinn, Macpeak and Seas

[57] ABSTRACT

A video memory control device for a two-field video signal that is buffered in a memory having capacity for one field. The phase of the writing to and reading from the memory may be such that the fields are being swapped on output. To display the correct sequence without losing any fields, the reading address for one field is delayed by 1H or the reading address for the other field is advanced by 1H dependent on the detected phase. A similar technique may alternatively be applied to the writing side.

8 Claims, 5 Drawing Sheets

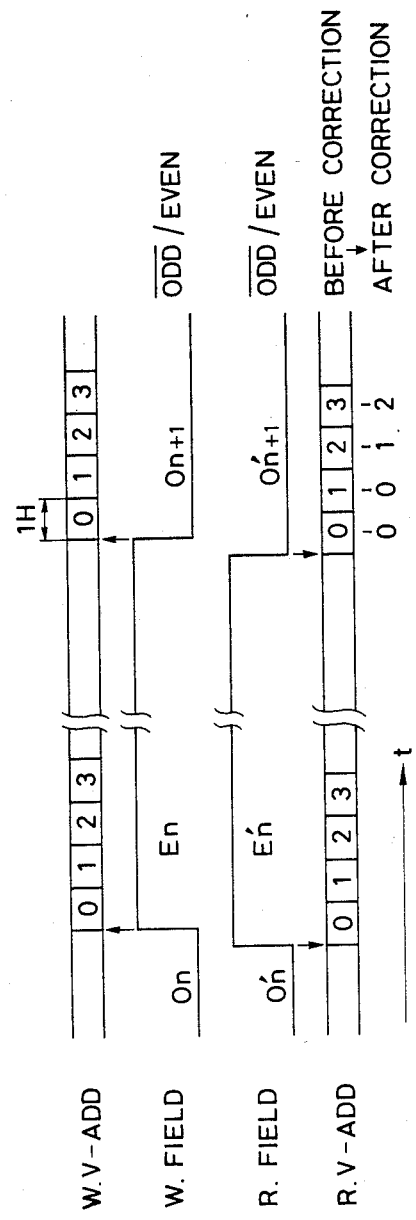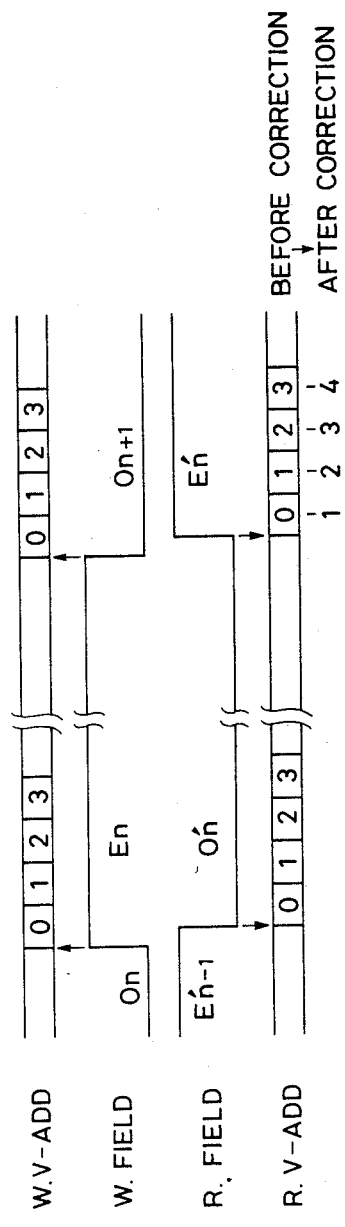

FIG. 5a  IN CASE THAT EVEN-NUMBERED FIELD IS ADVANCED BY 1H
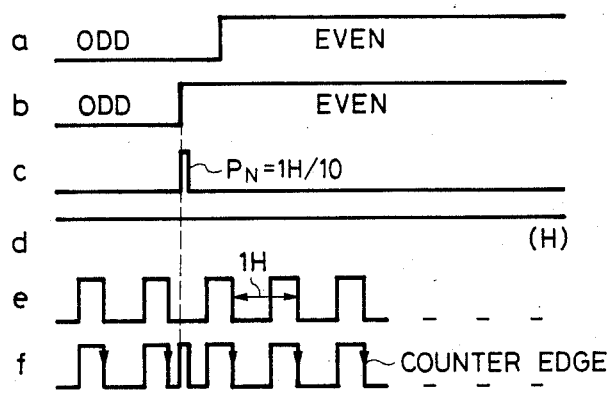
FIG. 5b  IN CASE THAT ODD-NUMBERED FIELD IS DELAYED BY 1H
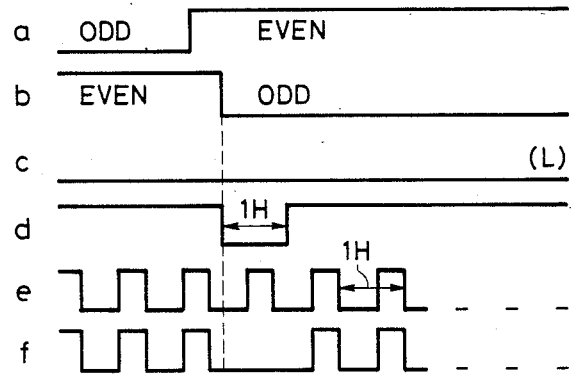

VIDEO MEMORY CONTROL DEVICE

BACKGROUND OF THE INVENTION

1. Field of the Invention

This invention relates to correction of the swapping of fields in a field memory type synchronizer.

2. Background of the Invention

In many video systems, video information is sequentially transmitted in two fields. For the purposes of this specification, the respective fields will be designated as odd-numbered (ODD or O) fields and even-numbered (EVEN or E) fields. Each field contains a large number of horizontal lines of data which are sequentially scanned across and then down a screen. When an ODD field has been completed, an EVEN field is processed similarly. However the horizontal scan lines, for the EVEN fields are displayed vertically offset between the horizontal scan lines in a process called interlacing.

Because of cost, it is preferable to employ a 1-field memory which is small in capacity, as a synchronizer for the synchronous conversion of video signals. In the 1-field memory system, owing to the phase relation between the input video signal and the reference synchronization of the synchronizer, the odd-numbered (ODD or O) field may be read as an even-numbered (EVEN or E) field, or vice versa. That is, the timing of the reading of the field memory is offset in time from its writing to the extent that the reading of a location in the field memory for one type of field occurs when that location actually contains the other type field.

In this case, the odd-numbered fields and the even-numbered fields are inverted in vertical position. This can be corrected with only a slight offset in screen image by time delaying by one horizontal scanning line period (hereinafter referred to as "1H") the fields which have become the odd-numbered fields by the swapping of fields. This will become more apparent from FIG. 1. Part (a) of FIG. 1 shows the correctly oriented lines formed by input signals, part (b) shows the case where the fields are simply swapped with each other, and the part (c) the case where, after swapping, the odd-numbered fields are delayed by 1H.

A conventional field memory synchronizer of this type is as shown in FIG. 2. The operation of the field memory synchronizer will be described with reference to FIG. 2.

In FIG. 2, a video signal applied to a video signal input terminal 1 is converted into a digital signal by an A/D (analog-to-digital) converter 2 with the aid of a clock pulse generated by a writing clock pulse generating section 3. The digital signal is written in a field memory 6. On the other hand, with the aid of the writing clock pulse, a writing address generating section 4 outputs a writing address signal, which is applied through a memory control section 5 to the field memory 6 to control the field memory 6.

On the read-out side, a reading clock pulse generating section 8 produces a reading clock pulse with the aid of a reference signal applied to a reference signal input terminal 7. The clock pulse is applied to a D/A (digital-to-analog) converter 13 and a reading address generating section 9 so that the reading address generating section 9 produces a reading address signal. Similarly as in the case of the writing address signal, the reading address signal is applied through the memory control section 5 to the field memory 6 so that an address from which data is to be read out of the field memory 6 is specified.

A field swap detecting section 10 receives signals based on the writing address and the reading address and outputs a signal to trip the armature of a switch 12 over to its contact b when, during field swapping, the odd-numbered fields are read. As a result, the odd-numbered field area is read after the swapping of the fields, and the digital signal read out of the memory 6 is applied to a 1H delay line 11 so that the swapped fields are rearranged. The output signal of the 1H delay line 11 is applied to the D/A converter 13, so that it is provided, as an analog signal, at the output terminal 14.

The conventional field memory synchronizer is designed as described above and therefore needs the 1H delay line 11 and the switch 12. In order to perform the 1H delay in a digital mode as shown in FIG. 2, the 1H delay line 11 may be made up of shift registers. However, in this case, a number of shift registers must be used because one clock pulse period is much shorter than one horizontal synchronizing period. If the number of bits quantized is represented by n, then n switch circuits are required because the switch 12 must be provided for each of the bits. Thus, the conventional field memory synchronizer is disadvantageous in that the number of circuits is relatively large and accordingly the manufacturing cost is also relatively high.

SUMMARY OF THE INVENTION

Accordingly, an object of this invention is to eliminate the above-described difficulties accompanying a conventional field memory synchronizer.

The invention can be summarized as a field memory synchronizer in which, according to the phase relation between an input video signal and a reference synchronization, reading addresses or writing addresses are advanced or delayed by 1H, so that the swapping of fields can be corrected whenever swapping occurs.

BRIEF DESCRIPTION OF THE DRAWINGS

FIGS. 3a and 3b are timing charts for a description of the difficulties which are caused when addresses are processed.

FIGS. 5a and 5b are timing charts for a description of the operation of the control device shown in FIG. 4.

DETAILED DESCRIPTION OF THE PREFERRED EMBODIMENTS

Figure 1:
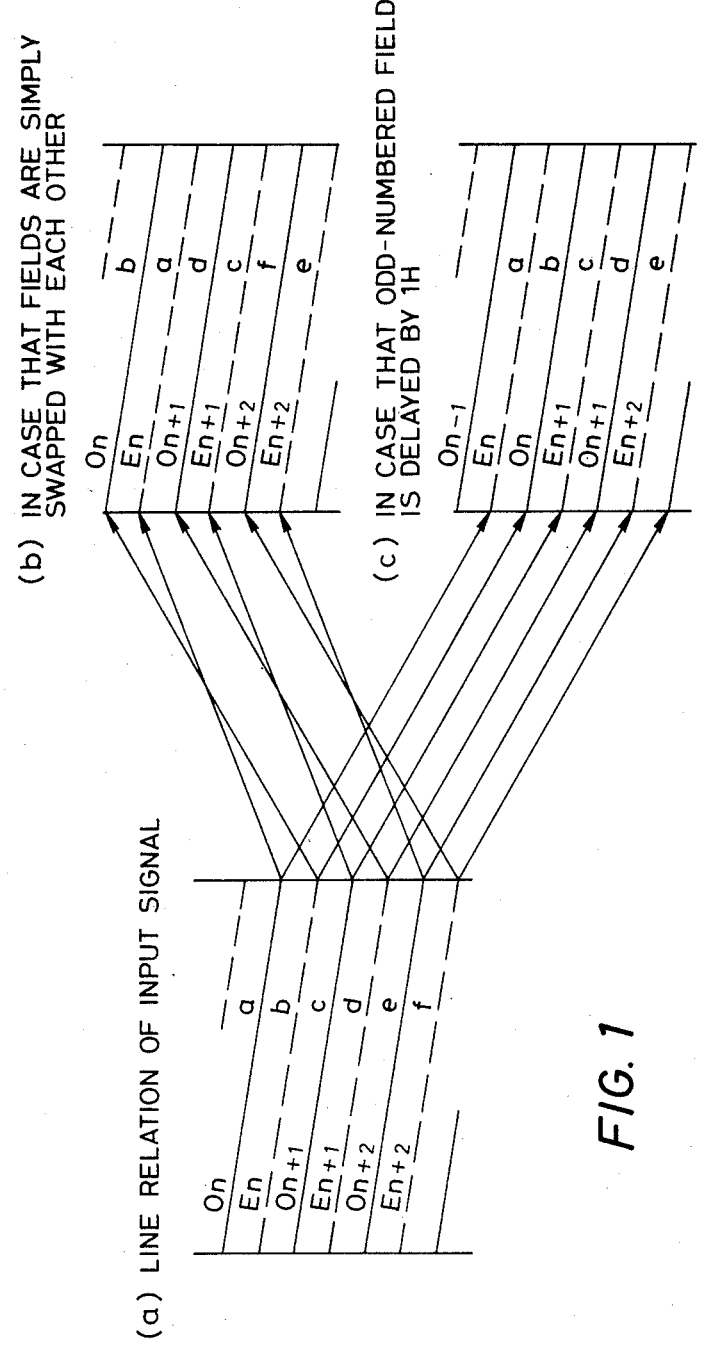
FIG. 1 is an explanatory diagram showing the vertical positions of scanning lines in the case where fields are swapped.

This invention will be described with reference to the case where, for simplification in description, the sampling frequency is an integer times $f_H$ (for instance 4 $f_{sc}=910 f_H$, the horizontal synchronizing frequency $f_H$ is the inverse of 1H), and the writing address and the reading address each consist of horizontal and vertical addresses H-ADD and V-ADD. The horizontal addresses H-ADD divide one line of a picture into equal parts. The vertical addresses V-ADD correspond to sequential scanning lines.

If, when the fields are being swapped, the top vertical address V-ADD of each of the odd-numbered fields is held for 1H so that the addresses V-ADD are read out with a delay time of 1H, then the pictures of the odd-numbered fields are shifted by 1H. This is equivalent to the application of the addresses to the 1H delay line. However, in the synchronizer, sometimes the phase relation between the input video signal and the reference synchronization is as shown in FIG. 3a. In FIG. 3a, reference character "W. Field" designates the variation of field based on the reference synchronization on the writing side, and "R. Field" represents the variation of field based on the reference synchronization on the reading side. When, as shown in FIG. 3a, "R. Field" precedes "W. Field" and the difference therebetween is within 1H, the content of $E'_n$ of reading is $O_n$ writing, and the content of $O'_{n+1}$ of reading is $E_n$ of writing. That is, swapping of the fields is occuring. Therefore, if, to compensate in reading an odd-numbered field, R. V-ADD1 is delayed by 1H as shown for the odd-numbered field, then for instance in reading V-ADD 1, the content of the V-ADD 1 read is $O_{n+1}$ because $E_n$ has been rewritten as $O_{n+1}$ in the field memory during the 1H delay. That is, in the case of the figure, since the fields are being swapped, the correction is required. However, if in reading an odd-numbered field, the address is delayed by 1H, then the data of even-numbered fields are each read out over both the even and odd fields. Therefore in case of FIG. 3a, the above-described correction cannot be performed.

When the fields are being swapped, the correction may also be made by a method also in which the pictures of the even-numbered fields are advanced by 1H. This can be realized by adding an address corresponding to 1H to the top address V-ADD of each of the even-numbered fields. However, this method cannot be applied to the case shown in FIG. 3b. In FIG. 3b, similarly as in FIG. 3a, by processing V-ADD the data read for $E'_n$ becomes the data written for $O_n$ and $E_n$, and the data of odd-numbered fields are lost.

As is apparent from the above description, the method of advancing the even-numbered fields by 1H should be employed for the case where the phase relation is as shown in FIG. 3a, and the method of delaying the odd-numbered fields by 1H should be employed for the case where the phase relation is as shown in the FIG. 3b. In these cases, none of the data is lost during swapping correction. Thus, it is essential for the video memory control device of the invention that a plurality of address processing means are suitably switched in operation.

Figure 2:
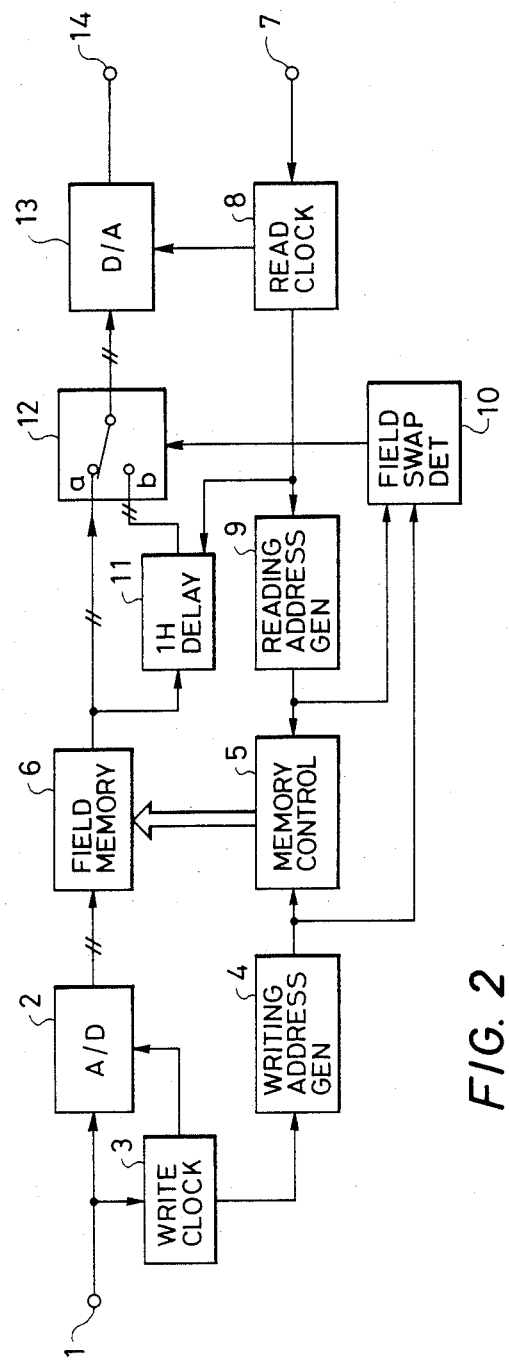
FIG. 2 is a block diagram showing the arrangement of a conventional field memory synchronizer.

One embodiment of this invention will be described with reference to FIG. 4, in which circuit elements corresponding functionally to those which have been already described with reference to FIG. 2 are therefore designated by the same reference numerals or characters, and the preceding description is applicable thereto. However, it should be noted that the writing address generating section 4 in FIG. 2 is divided into a writing H-address generating section 4a and a writing V-address generating section 4b in FIG. 4. Similarly, the reading address generating section 9 in FIG. 2 is divided into a reading H-address generating section 9a and a reading V-address generating section 9b in FIG. 4.

Figure 4:
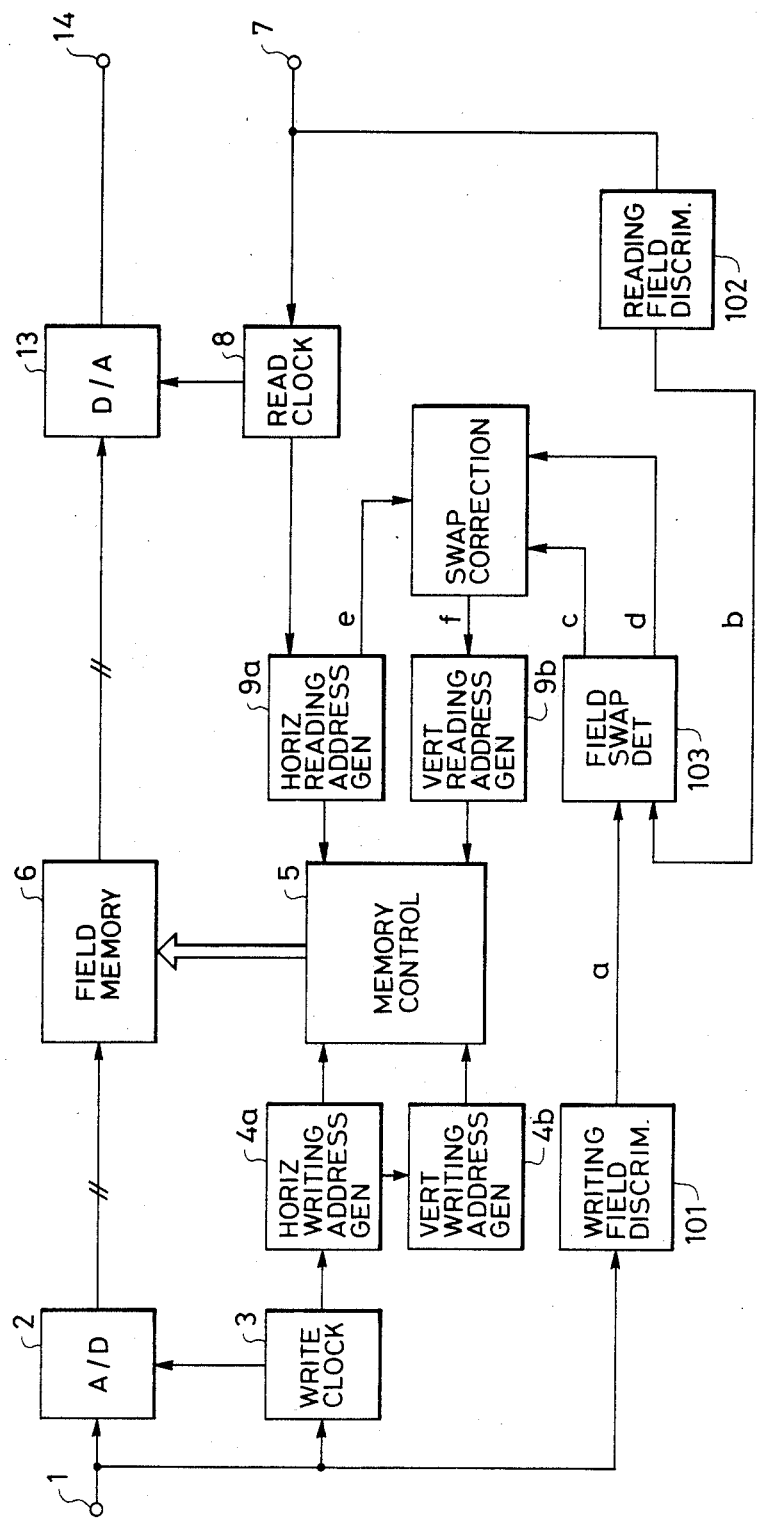
FIG. 4 is a block diagram showing one example of a video memory control device according to this invention.

Further in FIG. 4, a writing field discriminating section 101 produces a pulse whose polarity is changed according to whether the field of an input video signal is an odd-numbered one or an even-numbered one. A reading field discriminating section 102 discriminates reading fields according to the reference synchronizing signal. A field swap detecting section 103 detects the swapping of fields according to a writing field discrimination signal and a reading field discrimination signal. A swap correction section 104 controls the reading V-address generating section 9b according to the output of the reading field discriminating section 103. The reading field discriminating section 103 operates in the same manner as the field swap detecting section 10 in FIG. 2. Therefore, it can be considered that, in the embodiment, the swap correction section 104 replaces the 1H delay line 11 and the switch 12 of the conventional field memory synchronizer shown in FIG. 2.

The operation of the video memory control device of the invention shown in FIG. 4 will now be described in detail.

Each of the four address generating sections 4a, 4b, 9a and 9b is made up of a counter. For instance on the writing side, the clock pulse inputted from the writing clock pulse generating section 3, having a frequency $nf_H'$, an integral multiple of the horizontal synchronizing frequency $f_H$ and being synchronous in phase with the horizontal synchronizing signal, is frequency-divided in the horizontal address generating section 4a, as a result of which the H-address is provided. The 1H period pulse outputted by the H-address generating section 4 is applied, as a clock pulse, to the V-address generating section 4b, so that the V-address is produced. On the other hand, on the reading side, in order to control the V-address when the fields are being swapped, the 1H period pulse e outputted by the H-address counter 9a is applied to the correcting circuit 104, where a clock pulse corresponding to 1H is added thereto or subtracted therefrom, as a result of which a pulse f is outputted by the correcting circuit 104. As was described above, with the aid of the outputs a and b of the writing field discriminating section 101 and the reading field discriminating section 102, the field swap detecting section 103 detects the swapping of fields. The field swap detecting section 103 outputs two pulses c and d. More specifically, when the fields are being swapped, and the even-numbered fields should be advanced by 1H, the pulse c is outputted as an effective pulse; and, when the odd-numbered fields should be delayed by 1H, the pulse d is provided as an effective pulse. When the swapping of the fields is not detected, neither of the pulses c and d is effective.

The waveforms of the signals a through f in FIG. 4 are as shown in FIGS. 5a and 5b. FIGS. 5a and 5b are for the cases which are the same in phase relation as the cases shown in FIGS. 3a and 3b. The signals a and b correspond respectively to the "W. Field" pulse and the "R. Field" pulse shown in both FIG. 3a and 3b. In the embodiment the field swap detection section 103 detects the fact that, as shown in the FIG. 5a, the signal a rises within 1H after the rise of the signal b, and only in this case the signal c having a pulse width of H/10 (up to H/2) is produced in synchronization with the rise of the signal b. The periodic nature of the signals allow the signal c to be produced before the rise of the signal a. The signal c is added to the 1H period clock pulse e to form the clock pulse f which is applied to the counter 9b. As a result, the V-address is shifted so that the even-numbered field is advanced by 1H.

In the case other than in FIG. 5a, the field swap detection section 103 detects the fact that, as shown in FIG. 5b, the signal b falls with the signal a at the "H" (high) level, and the field swap detection section 103 outputs the pulse d 1H in pulse width in response to the fall of the signal b. For this period, the clock pulse e is effectively blocked to thus form the clock pulse f which does not have a clock pulse occurring for the period of 1H as shown in the FIG. 5b. As a result, the V-address is shifted so that the odd-numbered field is delayed by 1H.

As is apparent from the above description, the swapping of fields can be stably corrected by suitably selecting the means for advancing the reading V-address by 1H and the means for delaying the reading V-address by 1H.

In the above-described embodiment, in order to correct the swapping of fields, on the reading side, the addresses are controlled. However, the same effect can be obtained by a method in which, on the writing side, the addresses are controlled and are then read in the ordinary order. That is, in the case when the fields have been swapped, delaying the odd-numbered fields by 1H in reading them is equivalent to delaying the even-numbered fields by 1H before writing them, and advancing the even-numbered fields by 1H in reading them is equivalent to advancing the odd-numbered fields by 1H in writing them. In this modification, the arrangement is substantially equal to that shown in FIG. 4. However, it should be noted that the correcting means 104 is connected between the writing counters 4a and 4b. In the modification, the addresses should be processed so that the data of the fields on one side may not be eliminated. That is, in the case where the phase relation is as shown in FIG. 3a, the even-numbered field writing addresses should be delayed by 1H. In the case of FIG. 3b, the means for advancing the oddnumberd fields by 1H should be selected. The correcting signals c and d should be produced in synchronization of the edge of the writing field discriminating signal a.

The two means for correcting the swapping of field may be the means for delaying the even-numbered fields by 1H on the writing side and the means for delaying the odd-numbered fields by 1H on the reading side, or the means for advancing the odd-numbered fields by 1H on the writing side and the means for advancing the even-numbered fields by 1H on the reading side.

In the above-described embodiment, only in the case of FIG. 5a or the like, the means for advancing the even-numbered fields by 1H is selected, and, when the difference between the edges of the signals a and b exceeds 1H, the means for delaying the odd-numbered fields by 1H is selected. The two means may be switched in other ways.

In the above-described embodiment, for simplification in description, the system clock pulse frequency is an integral multiple of $f_H$, and the address counters are provided separately according to the H (horizontal) direction and the V (vertical) direction. However, a different clock pulse frequency and a different address counter arrangement may be employed together with the address 1H increasing and decreasing means, providing the same effects.

In the above-described embodiment, a line in an ODD field and a line in an EVEN field below that in the ODD field by 0.5H are written into the same position in a field memory. However, it is also possbile to write a line in the ODD field and a line in the EVEN field above that in the ODD field by 0.5H into the same position in the memory. In this case, if fields to be subject to address processing are swapped, the same effect can be obtained.

As was described above, in the video memory control device of the invention, the address advancing means and the address delaying means are suitably selected in order to correct the swapping of addresses. Therefore the control device of the invention is free from the difficulty attributed to the processing of addresses, and can therefore achieve the synchronous conversion of a video signal stably at all times. As a result, the 1H delay means and the number of switches circuit, which are heretofore required for field correction, can be eliminated. This contributes to a reduction of the number of circuit element and accordingly to a reduction of the manufacturing cost.

What is claimed is:

1. A video memory control device for the synchronous conversion of video signals transmitted in a first field and a second field, each field comprising a plurality of lines, each line having a period of substantially 1H in duration, said lines intended for display in a correct sequence of a line of said first field being followed by a line of said second field, said system comprising:
    a digital memory having a capacity corresponding to one of said fields;
    writing means for writing received video signals into said memory according to a writing address;
    reading means for reading data from said memory according to a reading address;
    sequential addressing means for sequentially providing both said writing address and said reading address;
    address processing means for altering an operation of said sequential addressing means, said address processing means comprising:
    first means for advancing said reading address by a period of substantially 1H in duration; and
    second means for delaying said reading address by a period of substantially 1H in duration; and
    means for selectively enabling one of said first and second means according to a phase relation between first data indicating whether said writing address is for said first field or said second field, and second data indicating whether said reading address is for said first field or said second field, whereby said reading address is generated in a corrected sequence, allowing lines to be displayed in said correct sequence.

2. A video memory control device as recited in claim 1, wherein said second means delays said reading address for said first field but not said second field, and said first means advances said reading address for said second field but not for said first field.

3. A method for controlling a video memory for the synchronous conversion of video signals transmitted in a first field and a second field, each field comprising a plurality of lines, each line having a period of substantially 1H in duration, said lines intended for display in a correct sequence of a line of said first field being followed by a line of said second field, said method comprising the steps of:
    writing received video signals into a memory having a capacity corresponding to one of said fields according to a writing address;
    reading data from said memory according to a reading address;
    sequentially providing both said writing address and said reading address;

correcting sequentially provided writing and reading addresses from said sequentially providing step, said correcting step comprising:
   a first sub-step of advancing said reading address by a period of substantially 1H in duration; and
   a second sub-step of delaying said reading address by a period of substantially 1H in duration; and
selectively performing one of said first and second sub-steps according to a phase relation between first data indicating whether said writing address is for said first field or said second field, and second data indicating whether said reading address is for said first field or said second field, whereby said reading address is generated in a corrected sequence, allowing lines to be displayed in said correct sequence.

4. A video memory control method as recited in claim 3, wherein said second sub-step delays said reading address for said first field but not said second field, and said first sub-step advances said reading address for said second field but not for said first field.

5. A video memory control device for the synchronous conversion of video signals transmitted in a first field and a second field, each field comprising a plurality of lines, each line having a period of substantially 1H in duration, said lines intended for display in a correct sequence of a line of said first field being followed by a line of said second field, said system comprising:
   a digital memory having a capacity corresponding to one of said fields;
   writing means for writing received video signals into said memory according to a writing address;
   reading means for reading data from said memory according to a reading address;
   sequential addressing means for sequentially providing both said writing address and said reading address;
   address processing means for altering an operation of said sequential addressing means, said address processing means comprising:
      first means for advancing said writing address by a period of substantially 1H in duration; and
      second means for delaying said writing address by a period of substantially 1H in duration; and
   means for selectively enabling one of said first and second means according to a phase relation between first data indicating whether said writing address is for said first field or said second field, and second data indicating whether said reading address is for said first field or said second field, whereby said writing address is generated in a corrected sequence, allowing lines to be displayed in said correct sequence.

6. A video memory control device as recited in claim 5, wherein said first means advances said writing address for said first field but not said second field, and said second means delays said writing address for said second field but not said first field.

7. A method for controlling a video memory for the synchronous conversion of video signals transmitted in a first field and second field, each field comprising a plurality of lines, each line having a period of substantially 1H in duration, said lines intended for display in a correct sequence of a line of said first field being followed by a line of said second field, said method comprising the steps of:
   writing received video signals into a memory having a capacity corresponding to one of said fields according to a writing address;
   reading data from said memory according to a reading address;
   sequentially providing both said writing address and said reading address;
   correcting sequentially provided writing and reading addresses from said sequentially providing step, said correcting step comprising:
      a first sub-step of advancing said writing address by a period of substantially 1H in duration; and
      a second sub-step of delaying said writing address by a period of substantially 1H in duration; and
   selectively performing one of said first and second sub-steps according to a phase relation between first data indicating whether said writing address is for said first field or said second field, and second data indicating whether said reading address is for said first field or said second field, whereby said writing address is generated in a corrected sequence, allowing lines to be displayed in said correct sequence.

8. A video memory control method as recited in claim 3, wherein said first sub-step advances said writing address for said first field but not said second field, and said second sub-step delays said writing address for said second field but not said first field.

* * * * *